United States Patent [19]

Benz

[11] 4,391,727

[45] Jul. 5, 1983

[54] NON-CAKING BLEACH CONTAINING MOLECULAR SIEVE ZEOLITE

[75] Inventor: Claude L. Benz, Belle-Mead, N.J.

[73] Assignee: Colgate Palmolive Company, New York, N.Y.

[21] Appl. No.: 299,506

[22] Filed: Sep. 4, 1981

Related U.S. Application Data

[63] Continuation of Ser. No. 185,730, Sep. 11, 1980, abandoned, which is a continuation of Ser. No. 814,033, Jul. 8, 1977, abandoned, which is a continuation of Ser. No. 640,791, Dec. 15, 1975, abandoned.

[51] Int. Cl.[3] .......................... C01B 15/12; C09K 3/00; C11D 7/20; C11D 7/54

[52] U.S. Cl. .......................................... 252/99; 252/95; 252/140; 252/174; 252/174.14; 252/174.25; 252/186.3; 252/385

[58] Field of Search .................... 252/95, 99, 131, 140, 252/174, 174.14, 174.25, 179, 186.3, 385

[56] References Cited

U.S. PATENT DOCUMENTS

| | | | |
|---|---|---|---|
| 3,290,158 | 12/1966 | Treat | 252/385 |
| 3,639,248 | 2/1972 | Moyer | 252/99 X |
| 3,755,180 | 8/1973 | Austin | 252/95 |
| 3,868,336 | 2/1975 | Mazzola | 252/383 |
| 3,982,892 | 9/1976 | Gray | 252/99 X |
| 4,055,505 | 10/1977 | Gray | 252/102 |
| 4,064,062 | 12/1977 | Yurko | 252/99 |
| 4,136,051 | 1/1979 | Saran | 252/91 |
| 4,215,007 | 7/1980 | Krings | 252/174.25 |
| 4,274,975 | 6/1981 | Corkill | 252/140 |
| 4,330,423 | 5/1982 | Smolka | 252/99 |

FOREIGN PATENT DOCUMENTS

| | | | |
|---|---|---|---|
| 813581 | 10/1974 | Belgium | 252/131 |
| 2538680 | 3/1976 | Fed. Rep. of Germany | 252/174.25 |
| 1473201 | 5/1977 | United Kingdom | 252/131 |

OTHER PUBLICATIONS

Linde Molecular Sieve Bulletin: "Scavenging Water and Other Impurities with Molecular Sieves", Published by Union Carbide, Dec. 1971, 4 pages.

*Primary Examiner*—Dennis L. Albrecht

[57] ABSTRACT

A non-caking bleaching composition, based on sodium perborate as the active bleaching component, includes certain proportions of sodium perborate tetrahydrate, water soluble inorganic builder salt and an aluminum silicate zeolite. The composition is a free flowing particulate spray dried base admixed with the sodium perborate tetrahydrate and at least part of the zeolite.

3 Claims, No Drawings

NON-CAKING BLEACH CONTAINING MOLECULAR SIEVE ZEOLITE

This is a continuation, of application Ser. No. 185,730 filed Sept. 11, 1980 which is a continuation of U.S. application Ser. No. 814,033 filed July 8, 1977, which in turn is a continuation of U.S. application Ser. No. 640,791 filed Dec. 15, 1975, said earlier filed applications now abandoned.

This invention relates to bleaching compositions. More particularly, it relates to such compositions based on sodium perborate tetrahydrate, which, due to a content of molecular sieve zeolite, are non-caking on storage.

Bleaching compositions based on sodium perborate are known and it is realized that the effectiveness of such bleaches depends on the release from them of active oxygen. The decomposition of the sodium perborate and the release of the oxygen may be accelerated by heating or through the employment of activators, many of which have been described in the prior art. Otherwise, the release of active oxygen from sodium perborate solutions is often too slow to be successful in bleaching operations. However, during storage slow decomposition of the perborate may occur, whether or not activators are used, with attendant release of moisture and the released moisture may act to form hydrates or co-hydrates with other inorganic salts in the bleaching composition, such as sodium silicate, sodium carbonate and sodium sulfate. The net result of such a recrystallization is often the production of a severely caked product. Such a product is not susceptible to post-treatment, after caking, to make it free flowing. Therefore, the caking problem confronted in the manufacture and sale of perborate-based bleaches when sodium perborate tetrahydrate was employed in them was a significant one and such products had to be very carefully packaged, stored and formulated to avoid caking and accompanying loss of value. A simple and effective solution to this problem is the subject of this patent application.

In accordance with the present invention a non-caking bleaching composition comprises from 15 to 50% of sodium perborate tetrahydrate, from 25 to 75% of water soluble inorganic salt and from 5 to 30% of a dry molecular sieve zeolite having the capacity to be hydrated or further hydrated to the extent of at least 10% of its weight, the proportion of molecular sieve zeolite being at least $\frac{1}{4}$ that of the sodium perborate tetrahydrate in the composition. Preferably, the composition will be free of phosphates and phosphorus compounds and will contain primarily sodium perborate tetrahydrate, sodium silicate, sodium carbonate, sodium sulfate and type 4A molecular sieve zeolite in substantially anhydrous form, with each of the components being present in certain given ranges of proportions. Also preferably, most of the composition will be in spray dried bead or globular form, with the sodium perborate tetrahydrate being present as a separate finely divided powder. All or part of the proportion of molecular sieve zeolite present may also be in such powder form and part may be in the spray dried beads.

The sodium perborate utilized in the present invention is in the form of the tetrahydrate. However, accompanying the required amount of tetrahydrate in the present compositions may be other forms of the perborate and other percompounds, e.g., sodium carbonate peroxide, sodium percarbonate, with the perborate normally being the major percompound bleaching constituent. Also, during storage, the tetrahydrate may sometimes lose water, even when not decomposing, to form the lower hydrate, sodium perborate monohydrate, and to form the anhydrous borates. However, in the most highly preferred embodiments of the present invention the sodium perborate will be in the form of the tetrahydrate.

With the sodium perborate tetrahydrate there will be present inorganic salt(s), such as water soluble salts of silicic acids, carbonic acid, sulfuric acid and polyphosphoric acids. Preferably such salts will be alkali metal salts and of the alkali metal salts, although both sodium and potassium salts may be utilized, the sodium salts are preferred. The most preferred salts are sodium silicate and sodium sulfate, although sodium carbonate is also a very useful component. The salts act as carriers for the percompound and they may also function to adjust the pH of the bleach water. The silicates and phosphates exert water softening effects, minimizing the production of insoluble and gelatinous soaps and other calcium and magnesium compounds which may be undesirable in bleaching operations. Such sequestrants are also especially useful to prevent iron staining of any of the materials being treated. Of course, iron staining may not be a problem in the presence of an active bleach but sometimes it can be.

For most desirable effects in the present compositions as a builder and a sequestrant for magnesium ions the sodium silicate should be of $Na_2O:SiO_2$ ratio in the range of 1:2 to 1:2.8. Preferably this range is from 1:2.2 to 1:2.6, e.g., 1:2.4. Although polyphosphates, such as pentasodium tripolyphosphate and tetrasodium pyrophosphate, may be employed (and also the corresponding potassium salts) they will often have to be omitted to comply with laws forbidding their use in detergent and bleach compositions. Additionally, when they are allowed to be employed in perborate bleach formulations the caking problem is diminished, due to the greater ability of the phosphates to absorb moisture without the formation of cement-like crystals or co-crystals with the other salts present.

The molecular sieve zeolites utilized in making the invented bleaching compositions are water insoluble, crystalline aluminum silicate zeolites of natural or synthetic origin which are characterized by having a network of uniformly sized pores of very small size, e.g., about 3 to 10 Angstroms, which size is uniquely determined by the unit structure of the zeolite crystal. Zeolites containing two or more networks of differently sized pores can also be employed. Amorphous forms of zeolites may also be useful but the crystalline forms, with pores of regular sizes, are better.

The molecular sieve zeolite employed is preferably also a univalent cation-exchanging zeolite, i.e., it should be an aluminosilicate containing a univalent cation such as sodium, potassium or lithium, when practicable, ammonium. Preferably, the univalent cation associated with the zeolite molecular sieve is an alkali metal, especially sodium or potassium, most preferably sodium.

Crystalline types of zeolites utilizable as molecular sieves in the invention, at least in part, include zeolites of the following crystal structure groups: A, X, Y, L, mordenite and erionite. Mixtures of such molecular sieve zeolites can also be useful, especially when type A zeolite, e.g., type 4A, is present. These preferred crystalline types of zeolites are well known in the art and are more particularly described in the text, *Zeolite Molecular Sieves*, by Donald W. Breck, published in 1974 by John Wiley & Sons. Typical commercially available zeolites of the aforementioned structural types are listed in Table 9.6 at pages 747–749 of the Breck text, which table is incorporated herein by reference.

Preferably the molecular sieve zeolite used in the invention is a synthetic molecular sieve zeolite. It is also preferable that it be of type A crystalline structure, more particularly described at page 133 of the aforementioned text. Especially good results are generally obtained in accordance with the invention when a type 4A molecular sieve zeolite is employed wherein the univalent cation of the zeolite is sodium and the pore size of the zeolite is about 4 Angstroms. The especially preferred zeolite molecular sieves are described in U.S. Pat. No. 2,882,243, which refers to them as Zeolite A.

Molecular sieve zeolites can be prepared in either a dehydrated or calcined form, the latter form containing from less than about 1.5% to about 3% of moisture, or in a hydrated or water loaded form which contains additional adsorbed water in an amount up to about 20 to 30% of the zeolite total weight, depending on the type of zeolite used. Preferably, the anhydrous or partially hydrated zeolite molecular sieves are employed in the compositions of this invention and it is especially important that they be able to sorb at least 10% of their weight in moisture, which can be incorporated into the crystalline structure of the zeolite. Most preferably, the anhydrous or substantially anhydrous form of the zeolite will be utilized, normally having a moisture content of less than 5%, preferably less than 3% and most preferably about 2% or even less. The manufacture of such crystals is well known in the art. For example, in the preparation of zeolite A, referred to above, the partially hydrated or hydrated zeolite crystals that are formed in the crystallization medium (such as hydrous amorphous sodium aluminosilicate gel) are subjected to high temperature dehydration (calcined to 3% or less water content), which is normally practiced in preparing such crystals for use as catalysts, e.g., cracking catalysts. However, in some cases the high temperature dehydration may be suspended before dehydration is complete or the temperature to which the hydrated molecular sieve zeolite is raised for dehydration may be lower, thereby resulting in the production of a partially hydrated form of the zeolite which is of a desired moisture content, e.g., 8%, still capable of sorbing at least 10% (anhydrous basis) of moisture.

Usually the molecular sieve zeolite should be in finely divided condition such as crystals (amorphous or poorly crystalline particles may also find some use) having mean particle diameters in the range of about 0.5 to about 12 microns, preferably 5 to 9 microns and especially about 5.9 to 8.3 microns, e.g., 6.4 to 8.3 microns.

Moisture is present in the described bleaching compositions as water of crystallization (bound moisture) or as "free moisture", that which is not chemically bound or in the form of a stable hydrate, but which may be physically held by the bleach composition ingredients. The product can tolerate a small amount of free moisture but an excess of free moisture will cause poor flow properties and can lead to caking. In the present compositions, so as to promote the stability of the perborate, it is desirable for the free or very loosely bound moisture content to be kept as low as possible. In some cases this may be up to 10% but normally it will be below 5%, desirably below 3% and most desirably it will be 2% or less, ideally 0%. Although with no moisture present it is virtually impossible for the product to cake due to hydration and the formation of crystals including water of hydration, still, with decomposition of the perborate during storage water is released and the hydratable salts present can be hydrated, and being hydrated, can form strong bends between crystals, thereby causing the undesirable cementing and caking effect.

In addition to the mentioned components of the product, up to 25%, preferably up to 15% and more preferably up to 10% of various adjuvants may also be present for their various effects. Thus, there may be utilized activators for the percompounds to assist them in releasing active oxygen in the liquid bleaching medium, normally an aqueous medium. Such activators include those of both the triazine and acyl types, such as 2-[bis(2-hydroxyethyl)-amino]-4,6-dichloro-s-triazine (BHADT), 2,4-dimethoxy-6-chloro-s-triazine (DCT), diacetyl dimethyl glyoxime (DDG) and tetraacetyl glycoluril (TAG).

Synthetic organic detergents may be present and these may be of the anionic or nonionic types. Although amopholytic and cationic detergents may sometimes be useful they are not usually employed in the present bleaching compositions. Also, the anionic synthetic organic detergents, while they are excellent surface active and detersive materials, can sometimes be at least partially inactivated by the large proportion of bleach present and therefore may be intentionally avoided. The nonionic detergents appear to be the most stable in the present bleaches. The nonionic detergents will normally be lower alkylene oxide condensation products, such as polyethylene oxides, which may sometimes have polypropylene oxide present but only to such an extent that the product is still water soluble. Preferred examples of such materials are the higher fatty alcohol-polyethylene oxide condensates wherein the higher fatty alcohol is of 10 to 18 carbon atoms, preferably 12 to 15 carbon atoms and the ethylene oxide portion thereof is a chain of 6 to 30 ethylene oxide units, preferably 7 to 15 ethylene oxide units and more preferably about 10 to 15 ethylene oxide units. Also useful are similar ethylene oxide condensates of phenols, such as nonyl phenol or isooctyl phenol but these are not preferred. When the anionic detergents are employed they will normally have from 8 to 26, preferably from 12 to 22 carbon atoms per molecule and usually will include an alkyl or aliphatic chain containing about 8 to 18 carbon atoms, preferably from 10 to 16 carbon atoms in a straight chain alkyl group. The most preferred of such detergents are the alkali metal higher alkyl-benzene sulfonates, such as the sodium and potassium salts, in which the higher alkyl groups are of 10 to 18 carbon atoms, preferably 12 to 14 carbon atoms and preferably also are linear. Other such anionic detergents include the alpha-olefin sulfonates, paraffin sulfonates, ethoxylated alcohol sulfates, alkyl sulfates and sulfated higher alkyl phenyl polyoxyethylene ethanols, all preferably as alkali metal salts, such as the sodium salts. A list of such detergents is found in U.S. Pat. No. 3,637,339. Included within the group of anionic detergents are the higher fatty acid soaps, the sodium salts of fatty acids of 12 to 18 carbon atoms.

Among the other adjuvants that may be present in the bleaching compositions, the most useful are fluorescent brighteners, colorants and perfumes and in some cases, flow improving agents, such as clays (although the molecular sieve zeolite may often sufficiently improve flow so as to obviate the employment of any clay). The fluorescent brighteners include the various cotton brighteners, polyamide brighteners and polyester brighteners, which may be reaction products of cyanuric chloride and the disodium salt of diaminostilbene disulfonic acid, benzidine sulfone disulfonic acids, aminocoumarins, diphenyl pyrazoline derivatives or naphthotriazolylstilbenes, such as for example, those sold under the names of Calcofluor, Tinopals RBS and 5BM and Phorwite BHC. SUch materials are described in the article *Optical Brighteners and Their Evaluation* by Per S. Stensby, a reprint of articles published in *Soap and Chemical Specialties* in April, May, July, August and September, 1967, especially at pages 3-5 thereof, which are incorporated herein by reference.

The proportions of the various components of the present bleach are important to its desirable functioning and to obtaining a product that will not cake on storage, even when subjected to higher than normal temperatures. The content of sodium perborate tetrahydrate for desirable bleaching effects is from about 15 to about 50%, preferably 15 to 40% and more preferably 30 to 40%, e.g., 32%. Inorganic salt(s) content is from about 25 to 75%, preferably 40 to 70% and more preferably 50 to 60%, e.g., 56%. When sodium sulfate and sodium silicate are the only inorganic salts present the proportions thereof will usually be 30 to 60% of sodium sulfate and 5 to 20% of sodium silicate, e.g., 40% and 15%, respectively and when sodium sulfate, sodium silicate and sodium carbonate are present the proportions will be about 30 to 50% of sodium sulfate, 5 to 15% of sodium silicate and 5 to 15% of sodium carbonate, preferably, 35 to 40% of sodium sulfate, 7 to 12% of sodium silicate and 7 to 12% of sodium carbonate. When other inorganic salts are present with the sodium sulfate and sodium silicate (and preferably also with the sodium carbonate), such as pentasodium tripolyphosphate, tetrasodium pyrophosphate, sodium bicarbonate and borax, the proportions of such materials or mixtures thereof will usually be from about 5 to 35%, preferably 10 to 25%, and will usually be at the expense of the sodium sulfate. When sodium chloride is employed as a filler it may replace up to 50% of the sodium sulfate content. The percentages of other materials optionally present will also usually replace part of the sulfate.

When activator(s) for the perborate are employed the proportions thereof will normally be from 10% to 50% of the perborate content, e.g., about 25% thereof. Of course, mixed activators may be utilized and the percentage given refers to the total amount of activators present. Similarly, mixtures of the various other types of constitutents of the present compositions may also be present, e.g., mixtures of silicates of different $Na_2O$:$SiO_2$ ratios. The proportion of detergent component utilized, if it is present at all, will generally be from 0.5 to 5%, preferably from 1 to 3% and it will be employed primarily for its surface tension lowering effects. Colorants are normally present in very small quantities, if at all, usually from 0.01 to 1% and often from 0.02 to 0.1%. The quantity of perfume utilized is variable but generally will be from 0.05 to 1%, preferably from 0.1 to 0.3%. Fluorescent brightener content may be from 0.01 to 2% and is usually from 0.5 to 1.5%. When it is employed, the percentage of clay (calcined aluminum silicate) flow improving agent is generally from 0.5 to 5% and preferably is from 0.5 to 2%.

The proportions of the various more significant components of the present compositions will normally be in the range of about 0.1 to 0.5:1:0.1 to 0.5:0.1 to 0.5:0.5 to 2:for molecular sieve zeolite:sodium perborate tetrahydrate:sodium silicate:sodium carbonate:sodium sulfate, preferably 0.2 to 0.4:1:0.2 to 0.4:0.2 to 0.4:0.8 to 1.5. Of course, such proportions are within the percentage ranges previously given. The moisture content will generally be in a range from about 0.05 to about 0.3:1, with respect to the molecular sieve zeolite present, often about 0.08 to 0.2:1. With respect to the ratios given, when the sodium carbonate is omitted from the formula the remaining ratios are still valid.

The various bleaching compositions may be made by admixing powdered compounds but it is preferred to spray dry, spray cool, drum dry, co-size-reduce or otherwise produce the major proportion of the composition, including the inorganic salts and most adjuvants except those which are unstable to such treatment, less the sodium perborate tetrahydrate and also less all or a part of the molecular sieve zeolite, and then mix with the major proportion of the product components the perborate and any remaining zeolite. Preferably, the major proportion of the product is made by spray drying and the particles thereby produced, preferably in globular or bead form, are classified or sieved so that over 95% thereof passes through a No. 8 U.S. Standard Sieve Series sieve and less than 10%, preferably less than 5% and most preferably 0%, passes through a No. 140 sieve. More preferably the particle size range is between No. 10 and No. 100 sieves. The perborate and any other particulate materials to be post-added to the spray dried product, except post-added molecular sieve zeolite, will normally pass through a No. 100 sieve and will fail to pass a No. 400 sieve, preferably passing through a No. 140 sieve and resting on a No. 325 sieve. The zeolite particle sizes have already been given and it is evident that they are much finer than the other powdered constituents of the product. Part of the zeolite content may be spray dried with the major proportion, largely an inorganic salt proportion, of the product or it may all be post-added. It is sometimes preferred to spray dry about half to 9/10, more preferably about 3/5 to 4/5 of the zeolite and to post-add the remaining portion. This provides for the portion of the zeolite in the spray dried or otherwise globular shaped particles of inorganic salt plus adjuvants to be less apt to deposit on the materials being bleached and at the same time permits the post-added zeolite to be intimately associated with the perborate tetrahydrate to prevent caking of the product by water released from it. It also helps to counteract the possible unstabilizing effects of ambient moisture on the perborate. However, normally all the molecular sieve zeolite will be post-added. The post-added molecular sieve zeolite may be previously blended with the perborate to be post-added, may be admixed with the spray dried or otherwise produced major component beads at the same time as the perborate or may be admixed with the previously admixed perborate-major component mixture. The spray drying is normally effected by utilizing drying air at about 250° C. in a countercurrent (or concurrent) spray drying tower and the sieved or classified particles of the largely inorganic spray dried product, often while still warm, are blended with the perborate tetrahydrate, which is at room temperature. It has been found by thermogravimetric analysis that sodium perborate tetrahydrate in the present formulations starts to decompose at temperatures as low as 40° C. and therefore it will usually be desirable to cool the spray dried product to a temperature of 30° C.

or less before mixing the perborate with it. However, if the described proportion of molecular sieve zeolite is premixed with the perborate even mixing at initial spray dried product temperatures as high as 40° C. or 45° C. will not cause objectionable caking or tackiness in the product and this is also the case if the molecular sieve zeolite is admixed with the perborate-spray dried components mixture within a short time, e.g., 30 seconds to three minutes after the first mixing is begun and while it is still in progress. Although all of the molecular sieve zeolite is preferably post-added and has the advantage of being intimately associated with the percompound so that it can sorb water therefrom as soon as it is released, thereby preventing caking, it may sometimes be desirable to have part of the molecular sieve zeolite content spray dried with the rest of the composition because it has been observed that when it is in the spray dried beads it is less liable to cause any undesirable deposition on materials being bleached. Such deposition is not usually of much importance with respect to white or light colored articles but may be objectionable when darker materials are being treated because the deposition of the very finely divided particles of the molecular sieve zeolite thereon, which may occur especially if bleaching is effected in an automatic washing machine with a draining and rinsing cycle, in which water is drawn through the materials being treated, can cause a dulling of the colors thereof. Although the presence of the molecular sieve zeolite in either the spray dried or post-added portion of the present products is permissible, within the guidelines given above, it is important that there be enough zeolite present to be able to counteract any undesirable affects due to release of moisture by the percompound during storage or at other times when it may be prematurely decomposing to release moisture. Thus, the proportion of molecular sieve zeolite employed should preferably be at least ¼ that of the sodium perborate tetrahydrate although lesser proportions will be somewhat useful, too. Preferably, the molecular sieve zeolite content will be as high as half the sodium perborate tetrahydrate content and in some cases may be even greater. Lesser amounts than that required to produce a 0.25 zeolite:perborate ratio can sometimes result in some caking or poor flow characteristics developing in the product.

Although it is preferred that the base proportion of the composition be spray dried and the percompound and some of the zeolite be post-added it is contemplated that other materials may be post-added too, when desirable, especially if they are unstable to heat. Thus, nonionic detergent, if solid, may be blended in powder form with the globular particles and if in liquid or waxy form, may be sprayed as small droplets or in atomized form onto tumbling composition particles to distribute it well throughout them. Also, perfumes and flow promoting agents may be sprayed onto or blended with the moving composition particles. When mixing or formulating methods are employed which do not cause the perborate or other materials to become unstable such materials may be blended with the inorganic salts and other components initially, rather than being post-added. Generally, however, the preferred methods described above will be employed for the manufacture of commercial products. In such products it is noted that little separation, if any, occurs on storage, probably due to the very small particle size of the molecular sieve zeolite and the initial filling of interstices between the spray dried globules with the fairly large proportion of sodium perborate tetrahydrate employed. The presence of the hydratable inorganic salts in globular form limits the contact areas of such particles with each other, so that even if moisture is released by the perborate tetrahydrate or otherwise gains access to them, there is a lower probability of adhesion or cohesion between particles to cause caking. The presence of molecular sieve zeolite with the perborate or in both the spray dried beads and the post-added material additionally helps to remove any objectionable moisture and aids in preventing caking. Thus, storage conditions of the present products are not as critical as those for products of similar composition but not treated with the molecular sieve zeolite and not having its dehydrating and other functional advantages.

Bleaching of the compositions of this invention may be carried out at various pH's and concentrations but normally the pH will be in the range of 8 to 12, preferably 8.5 to 10.5 and most preferably it will usually be about 9 to 10.5. The concentration of the bleaching composition in the aqueous medium, such as water, will generally be from 0.01 to 5% and preferably will be from 0.05 to 1%. The bleaching medium will usually be at about room temperature, normally from 15° C. to 30° C., e.g., 20° to 25° C. but may be in the range of 5° C. to 90° C. Usually the ratio of laundry to bleaching solution will be from 0.03 to 1, preferably 0.04 to 0.5. While bleaching may be effected in any suitable vessel, for convenience it is preferred to employed the tub of an automatic washing machine.

Although the present bleaches are what may be classified as safe bleaches, capable of being used with most materials, fabrics and dyes, care should still be taken in the selection of the materials to be bleached. When the bleaches are added to wash waters containing detergent compositions the washing times need not be changed from ordinary wash cycle times, which are usually from 3 to 45 minutes, preferably being from 5 to 20 minutes in the United States and from 20 to 40 minutes according to European practice. Similar or corresponding times may also be employed with respect to the use of the bleaching compositions alone or the corresponding application times normally employed for bleaches, e.g., 5 minutes to three hours, may be used. The present bleaches are useful in removing a wide variety of stains from fabrics, including coffee, tea, wine and dye stains, as well as in helping to remove ordinary soils and stains, such as those from dirt, carbon, clays, foods and body wastes. Such desirable results are obtained without harming the fabrics being treated and without serious adverse effects on dyed fabrics, such as blue-dyed polyester-cotton blends, which are often used as test fabrics to determine the safeness of bleaches.

The oxygen releasing percompound also possesses desirable antimicrobial properties and such properties appear to be aided by the presences of the molecular sieve zeolite and any surface active agents or organic detergents also in the bleaching medium. The surface active agent helps to wet the various surfaces to be treated with the perborate and the molecular sieve zeolite furnishes nuclei for perborate decomposition in aqueous media (while the product is in powder form it helps to insulate and stabilize the bleaching compound mixture against decomposition) and also adsorbs or entraps in its crystalline or amorphous matrix viral and bacterial materials, assisting in the antimicrobial effects of the oxygen-releasing perborate, which may release oxygen at such nuclei. Of course, the molecular sieve zeolite prevents lumping and caking of the composition and thereby assists in maintaining it free flowing and in separate particles which are more readily dispersed and dissolved when added to an aqueous bleaching medium and thereby the danger of localized overconcentrations and overbleachings is obviated. Thus, there is significant coaction between the various components of the present bleaching compositions and between them and the surface active or synthetic organic detergent components when such are present in these compositions, when the present bleaches are admixed with detergent compositions or when they are added to wash waters which include such compositions.

The various desirable effects described are obtained by means of a bleaching composition which is free flowing, stable on storage and non-caking and acceptable bleaching effects and combination washing-bleaching effects are obtainable without the need to raise the aqueous medium employed to its boiling point, as is sometimes considered necessary when employing sodium perborate as a bleach. Furthermore, any fugitive dyes which may be incompletely bleached by the perborate tend to be sorbed by the ultrafine zeolite molecular sieve particles and thereby do not selectively deposit on other fabrics being treated, which might otherwise cause an objectionable change in coloring of such fabrics.

The following examples are given to illustrate the invention but should not be considered as limiting it. Unless otherwise stated, all parts in the examples and the specification are by weight and all temperatures are in °C.

EXAMPLE 1

| COMPONENTS | PERCENT |
|---|---|
| Sodium perborate tetrahydrate | 31.7 |
| Sodium carbonate | 9 |
| Sodium silicate ($Na_2O:SiO_2$ = 1:2.35) | 9 |
| Calcined aluminum silicate clay | 1 |
| Fluorescent brighteners (mixture of Tinopal 5BM Conc. [Geigy] and Stilbene Brightener) | 0.5 |
| Sodium sulfate | 37.6 |
| Perfume | 0.2 |
| Type 4A anhydrous (2% moisture content) molecular sieve zeolite | 9 |
| Moisture | 2 |

The above bleaching composition, particularly suitable for the bleaching of permanent press fabrics, such as those based on cotton-polyester mixtures and also useful for the bleaching of Dacron ®-based products, is made by spray drying in a countercurrent spray tower, using drying air at about 250° C., a crutcher mix (70% solids content) comprising water, sodium silicate solution, light soda ash, anhydrous sodium sulfate and the mixture of fluorescent brighteners. The spray dried product obtained, sieved to comprise beads between 10 and 100 mesh, has a moisture content of about 2%. It is then mixed in a tumbling drum with sodium perborate, the flow promoting clay is also admixed and the perfume is sprayed onto the surfaces of the tumbling particles. The sodium perborate and the clay particles are in finely divided powdered form, with particle sizes in the range of 140 to 325 mesh. The clay particles may sometimes be smaller than indicated without any adverse effect on the properties of the product.

Next, the molecular sieve zeolite, with particle sizes in the 6.4 to 8.3 microns diameter range, is added to the tumbling mass and mixing is continued for about three minutes, after which time the product is homogeneous and may be packed for shipment. The entire mixing operation is conducted at about room temperature, 20° to 25° C., but the initial spray dried beads may be of temperature higher than room temperature and sometimes such temperatures are up to 45° C. However, in the most preferred processes of this example the spray dried beads are first cooled to a temperature no higher than 30° C. before mixing them with the sodium perborate tetrahydrate.

The product made is oven tested against a control product made in exactly the same manner without the post-addition of the molecular sieve zeolite. Both products are stored in covered glass jars in a temperature-controlled oven at 38° C.±0.5° C. for 22 hours. After such time the control product is caked and the experimental product is free flowing. This test comparison is verified by long term storage (3 to 6 months) under conditions wherein the product is subjected to heating and in some cases, to relatively high relative humidities. In such instances the desired improved result is also obtained for the "experimental" product vs. the control.

In variations of the above formula, the previously dry silicate, carbonate, sulfate and fluorescent brightener components, as finely divided powders in the 140 mesh to 325 mesh range, have the perfume sprayed onto the tumbling surfaces thereof in the manner previously described and are then admixed with a previously mixed combination of the sodium perborate tetrahydrate and the molecular sieve zeolite. The same improved stability on storage results, with the product being of lesser tendency to cake, compared to a control from which the molecular sieve zeolite is omitted. This is also the case when the various solid components of the product are co-size-reduced but it is considered that increased stability and better non-caking properties are obtained when the molecular sieve zeolite is post-added to the other co-size-reduced solid components after the perfume has been incorporated in them.

In further modifications of the formula given above the proportions of the various components are changed, so as to be ±10, ±20%, ±30% and ±50%, while still being within the ranges of percentages and proportions given in the specification. Additionally, activators for the perborate are employed, either BHADT, DCT, DDG or TAG or various mixtures thereof, to the extent of 25% of the content of perborate tetrahydrate (replacing equal quantities of sodium sulfate filler). In all such cases good bleaching, free flowing, non-caking products result. When, in all such experiments, half of the sodium sulfate content is replaced by pentasodium tripolyphosphate, tetrasodium pyrophosphate, sodium bicarbonate, borax or mixtures of equal parts of any combination thereof, the product resulting is superior in non-caking tendencies under normal and even under elevated temperature storage conditions.

When only the sodium perborate tetrahydrate and other molecular sieve zeolite are employed, omitting the other inorganic salts (usually hydratable), useful bleaching is obtained and the product is less apt to cake on storage than is the perborate tetrahydrate alone or with only clay to sorb excess moisture.

All of the compositions described in this example are satisfactory bleaches and antibacterial compositions when employed alone or in conjunction with a detergent composition in a combination washing-bleaching treatment. Such bleachings are effected by employing the bleaching compositions described at concentrations of 0.1%, 0.3%, 0.5% and 0.8% in the bleaching of permanent press fabrics (35% cotton, 65% polyester) in water of 150 parts per million hardness, as calcium carbonate, (3:2 Ca:Mg ratio, as $CaCO_3$) at temperatures from 25° C. to 80° C. Treatment times, which range from ten minutes to two hours, e.g., 15, 30, 60 and 90 minutes, depending on the material being bleached and the extent of bleaching necessary, are coordinated with the temperature of bleaching too, usually with the longer times being employed at the lower temperatures. Safe and effective bleachings of various laundry stains, including dyes, fruit stains, clay and organic stains are obtained and whiter fabrics result. Such is also the case when there is mixed with the bleaching medium a washing concentration, e.g., 0.15%, of heavy duty laundry detergent, such as one comprising 10% of sodium linear dodecylbenzene sulfonate, 2% of Neodol 45-11 (nonionic detergent), 1% of sodium higher fatty acid soap (4:1 hydrogenated tallow:hydrogenated coconut oil), 35% pentasodium tripolyphosphate, 45% sodium sulfate, 5% moisture and 2% adjuvants. In such tests the ratio of fabrics to be bleached:bleach composition will usually be in the range of 0.04 to 0.5, e.g., 0.2.

EXAMPLE 2

A composition of formula like that of the formula of Example 1 is made with the exceptions that half of the molecular sieve zeolite is present in (spray dried with) the spray dried composition and that 1% of clay and 1% of the sodium sulfate are replaced by Neodol 45-11 (nonionic higher fatty alcohol polyethoxyethanol) which is sprayed onto the tumbling spray dried product before admixing therewith of the sodium perborate tetrahydrate and the balance of the molecular sieve zeolite.

The product resulting is tested in the same manner as previously described and is found to be improved over a control product containing no zeolite, with respect to non-caking and free flowing characteristics. Also, when tested by the methods previously described it is a useful bleaching composition, especially at the higher temperatures mentioned.

Similar modifications of the composition are made wherein $\frac{1}{4}$ and $\frac{3}{4}$ of the molecular sieve zeolite are incorporated in the crutcher mix. In all such cases (when the molecular sieve zeolite is spray dried) less muting of the colors of dark colored materials and fabrics results.

The described experiments are repeated with the other variations of the formula of Example 1, with acceptable bleaching and flow characteristics resulting in the products made.

EXAMPLE 3

The various compositions of Examples 1 and 2 are modified by utilizing a type 4A molecular sieve which is 10% hydrated. At moisture contents of 1% and 2% in the product the partially hydrated molecular sieve is effective in preventing caking due to decomposition of small proportions of the sodium perborate tetrahydrate present. However, because the capacity of the molecular sieve zeolite for hydration is diminished (compared to an anhydrous molecular sieve zeolite) the compositions are less able to tolerate moisture and are less likely to be protected against caking over prolonged periods or when the product is subject to elevated temperatures and/or humid conditions. Resistance to caking is about comparable to that of those products wherein half of the anydrous type 4A molecular sieve zeolite is present in the spray dried composition (wherein it is partially hydrated due to being mixed with water in the crutcher).

Of course, the products of this example are useful perborate bleaches when employed in the manners described in the previous examples.

EXAMPLE 4

The compositions of Examples 1–3 are modified by replacing the type 4A molecular sieve zeolite with other type A molecular sieve zeolites and with those of types X, Y and L. The molecular sieve zeolites utilized are essentially anhydrous, containing less than 2% of moisture. The products made are of improved non-caking and free flowing properties, compared to control products wherein the molecular sieve zeolites are not present. However, the type 4A molecular sieve zeolite of Examples 1–3 is preferred for best anti-caking activity and water softening properties.

The invention has been described with respect to various illustrations and examples thereof but is not to be limited to these because it is evident that one of skill in the art will be able to utilize substitutes and equivalents without departing from the spirit of the invention.

What is claimed is:

1. A non-caking bleaching composition comprising: by weight from 28.5 to 34.9% sodium perborate tetrahydrate; from 8.1 to 9.9% sodium carbonate; from 8.1 to 9.9% sodium silicate having an $Na_2O:SiO_2$ ratio of about 1:2.35; from 0.9 to 1.1% calcined aluminum silicate clay; from 33.9 to 41.3% sodium sulfate; from 8.1% to 9.9% of a crystalline, water-insoluble aluminosilicate molecular sieve 4A zeolite having a particle size of from 5 to 9 microns, and being in about a 2% hydrated form; the composition having a moisture content of about 1.8 to 2.2%.

2. A composition according to claim 1 comprising about 31.7% sodium perborate tetrahydrate, about 9% sodium carbonate, about 9% sodium silicate, about 1% clay, about 37.6% sodium sulfate, about 9% zeolite, and about 2% moisture.

3. A composition according to claim 1 comprising spray dried particles of the sodium carbonate, sodium silicate and sodium sulfate in admixture with the sodium perborate tetrahydrate, the clay and the zeolite.

* * * * *